United States Patent [19]
Wolff

[11] Patent Number: 5,550,750
[45] Date of Patent: Aug. 27, 1996

[54] METHOD AND SYSTEM FOR INTEGRATING COMPONENT ANALYSIS WITH MULTIPLE COMPONENT PLACEMENT

[75] Inventor: Daniel W. Wolff, Lake Oswego, Oreg.

[73] Assignee: Mentor Graphics Corporation, Wilsonville, Oreg.

[21] Appl. No.: 69,148

[22] Filed: May 28, 1993

[51] Int. Cl.$^6$ .............................. G06F 17/50; G06G 7/32
[52] U.S. Cl. ......................... 364/491; 364/490; 364/578
[58] Field of Search .................................. 364/489, 490, 364/491, 578

[56] References Cited

U.S. PATENT DOCUMENTS

| | | | |
|---|---|---|---|
| 5,065,355 | 11/1991 | Hayase | 11/491 |
| 5,197,016 | 3/1993 | Sugimoto et al. | 364/490 |
| 5,377,122 | 12/1994 | Werner et al. | 364/488 |

OTHER PUBLICATIONS

Kirkpatrick et al., "Optimization by Simulated Annealing," Science, May 83, vol. 220, pp. 671–680.
Fu et al., "A Computed–Aided Layout System for Multilayered Hybrid Circuits," National Cheng Kung University Department of Electrical Engineering, Tainan, Taiwan, Republic of China, pp. 118–122.
Rottiers, et al., "An Automatic Placement Algorithm for Optimising Thermal Behaviour of Hybrid Circuits," Proceedings, Sixth European Microelectronics Conference, Jun., 1987, pp. 325–331.
Cahlon et al., "A Model for the Convective Cooling of Electronic Components with Application to Optimal Placement," Mathl Comput. Modelling, vol. 15, No. 2, pp. 59–75, 1991.
Tkatchenko et al., "The Optimization of Temperature Regime in Radiolectronic Devices When Solving Placement Problems," Technical University of Brno, Czechoslovakia; Polytechnical Institute of Lvov, USSR; pp. 46–48.

Sha et al., "An Analytical Algorithm for Placement of Arbitrarily Sized Rectangular Blocks," 22nd Design Automation Conference, Paper 38.1, pp. 602–608, 1985 IEEE.
Driscart et al., "The Boundary Element Method for Thermal Analysis of Electronic Equipment in a Multi–Dimensional Environment," Laboratory of Electronics, Ghent State University, Belgium, pp. 343–354.
De Mey et al., "Thermal Analysis of Hybrid Circuits with Mounted Components," Hybrid Circuits, No. 15, pp. 28–32, Jan. 1988.
Rottiers et al., "Hot Spot Effects in Hybrid Circuits," IEEE Transactions on Components, Hybrids & Mfg. Tech., vol. 11, No. 3, pp. 274–278, Sep. 1988.
Kovacs et al., "Thermal Performance of Multichip Modules," ISHM '91 Proceedings, pp. 17–21.
Demmin, "Thermal Modeling of Multi–Chip Modules," nCHIP, Inc., San Jose, California, pp. 1145–1154.
Chu et al., "Review of Thermal Design for Multi–Chip Modules," Mid–Hudson Valley Laboratory, IBM Corporation, Poughkeepsie, New York, pp. 1633–1642.
Wong et al., "Culprits Causing Avionic Equipment Failures," 1987 Proceedings Annual Reliability & Maintainability Symposium, pp. 416–421.
Estes, "Thermal Design Considerations for COB Applications," Hybrid Circuits, No. 17, pp. 49–55, 1988.
Alemanni et al., "Gelso: A 3–D Automatic Generation Programs System," FIAT Research Center SpA, Orbassano, Italy pp. 447–462.

(List continued on next page.)

Primary Examiner—Kevin J. Teska
Assistant Examiner—Thai Phan
Attorney, Agent, or Firm—Klarquist Sparkman Campbell Leigh & Whinston, LLP

[57] ABSTRACT

A method and system for integrating a detailed analysis of a component's behavior into a placement program. The method includes acquiring characteristics of a component, and from these characteristics, deriving a placement parameter to aid in the placement of multiple components in a circuit layout.

14 Claims, 3 Drawing Sheets

OTHER PUBLICATIONS

Botkin, "Shape Design Modelling Using Fully Automatic Three-Dimensional Mesh Generation," *Finite Elements in Analysis and Design 10*, pp. 165–181, 1991.

Devloo, "A Three-Dimensional Adaptive Finite Element Strategy," *Computers & Structures*, vol. 38, No. 2, pp. 121–130, 1991.

George et al., "Automatic 3D Mesh Generation with Prescribed Meshed Boundaries," *IEEE Transactions on Magnetics*, vol. 26, No. 2, pp. 771–774, Mar. 1990.

Bänsch, "Local Mesh Refinement in 2 and 3 Dimensions," *Impact of Computing in Science and Engineering 3*, pp. 181–191, 1991.

Coulomb et al., "A Finite Element Package for Magnetic computation," *IEEE Transactions on Magnetics*, vol. MAG-21, No. 6, pp. 2499–2503, Nov. 1985.

Boubez et al., "Automatic 3D Mesh Generation for Irregularly-Shaped Domains," Department of Electrical Engineering, McGill University, Montréal, Québec, Canada, pp. H-30–H-32.

Lai et al., "A Finite Element Method for Problems with Moving Parts," University of Bath, United Kingdom, pp. 211–213.

Shephard et al., "Trends in Automatic Three-Dimensional Mesh Generation," *Computers & Structures*, vol. 30, No. 1/2, pp. 421–429, 1988.

du Terrail, "GET3D—A 3D Mesh Generator for Finite Element Analysis of Electrical Devices," *Computer Applications in Production and Engineering*, Elsevier Science Publishers B.V. (North-Holland) ©IFIP, 1987, pp. 129–142.

Avaritsiotis et al., "Layout and Thermal Analysis of Power Devices Using a PC/XT," *Active and Passive Elec. Comp.*, 1990, vol. 14, pp. 95–109.

Reed et al., "Thermal Modeling of Hybrid Microelectronics," *IEEE*, pp. 235–239, 1988.

Casselman et al., "A Thermal Model for Hybrid Circuits," *Hybrid Circuits*, No. 10, May 1986, pp. 9–13.

De Mey et al., "Thermal Studies on Hybrid Circuits," *Hybrid Circuits, No. 17, Sep. 1988, pp. 8–11*.

Fukuoka et al., "Transient Temperature Rise for Multi-Chip Packages,"*Hybrid Circuits*, No. 3, Autumn 1983, pp. 52–57.

Armor et al., "Heat Flow in the Stator Core of Large Turbine-Generators, by the Method of Three-Dimensional Finite Elements, Part I" *IEEE Transactions on Power Apparatus & Systems*, vol. PAS-95, No. 5, Sep./Oct. 1976, pp. 1648–1656.Armor et al., "heat Flow in the Stator Core of Large Turbine-Generators, by the Method of Three-Dimensional Finite Elements, Part II" *IEEE Transactions on Power Apparatus & Systems*, vol. PAS-95, No. 5, Sep./Oct. 1976, pp. 1657–1668.

Preiss, "A Procedure for Checking the Topological Consistency of a 2–D or 3–D Finite Element Mesh," Ben–Gurion University of the Negev, Department of Mechanical Engineering, Beer Sheva, Israel, pp. 200–206.

Hoole, "A Memory Economic 3–D Finite Element Mesh Generator for Small Computers," *IEEE*, 1984, pp. 111–115.

Fukuoka et al., "An Application of the Thermal Network Method to the Thermal Analysis of Multichip Packages (Proposal of a Simple Thermal Analysis Model), " *Japanese Journal of Applied Physics*, vol. 28, No. 9, Sep. 1989, pp. 1578–1585.

"MSGMESH," Graphic displays created using the MSC/NASTRAN post-processor MSGVIEW, 4 pages, Oct. 1, 1982.

Siarry et al., "Thermodynamic Optimization of Block Placement," *IEEE Transactions on Computer–Aided Design*, vol. CAD-6, No. 2, Mar. 1987, pp. 211–221.

Danil'chenko et al., "An Adaptive Algorithm for Placement of Objects in a Computer Network," *Avotmatika i Vychislitel'naya Tekhinka*, vol. 2, pp. 18–21, 1987.

Razaz et al., "Fuzzy Set Based Initial Placement for IC Layout," University of East Anglia, School of Information Systems, Norwich, UK, pp. 655–659, IEEE 1990.

Broughton, "Non–Existent CAE Capabilities," 1988 *Proceedings* Reliability & Maintainability in CAE *Workshop*, pp. 39–41, 1988.

Schweikert, "A 2–Dimensional Placement Algorithm for the Layout of Electrical Circuits," Bell Telephone Laboratories, Incorporated, Murray Hill, New Jersey, pp. 102–110.

Lauther, "A Min–Cut Placement Algorithm for General Cell Assemblies Based on a Graph Representation," Siemens AG, Munich, Free Republic of Germany, pp. 182–191 (IEEE).

Chung et al., "An Airborne Adaptive Array Element Placement Algorithm," IEEE, pp. 249–252, 1985.

Preas et al., "Placement Algorithms for Arbitrarily Shaped Blocks," Stanford, California, pp. 199–205.

Breuer, "A Class of Min–Cut Placement Algorithms," University of Southern California Department of Electrical Engineering & Computer Science, Los Angeles, California, pp. 142–148.

Kozawa et al., "Automatic Placement Algorithms for High Packing density VLSI, " *20th Design Automation Conference Paper 13.3, pp. 175–181, IEEE 1983.*

Cheng, "Linear Placement Algorithms and Applications to VlSI Design," *Networks*, vol. 17, 1987, pp. 439–464, 1987.

Dolbear, "Thermal Management of Multichip Modules," *Electronic Packaging & Production*, Jun. 1992, pp. 60–63.

METHOD AND SYSTEM FOR INTEGRATING COMPONENT ANALYSIS WITH MULTIPLE COMPONENT PLACEMENT

BACKGROUND OF THE INVENTION

The invention relates to a method and system for providing a detailed analysis of a component's behavior for use in the placement of the component in a circuit layout. In particular, the invention relates to integrating a detailed analysis of a component's thermal, mechanical, or electromagnetic behavior with computer assisted placement of components in the design of a component layout.

In modern electronic circuit fabrication, electrical components such as semiconductor devices are mounted on printed circuit boards ("PCB"), and more recently, within multichip modules ("MCM"). In printed circuit board technology, semiconductor devices or "dies" are each separately encased in a package, such as the dual in line package ("DIP"), having pin connectors extending from the package for physically plugging or mounting the component to a circuit board. Multichip module or MCM technology further minimizes space consumption by placing several dies on a single substrate within a package enclosing all of the dies. In both technologies, the components of a circuit are interconnected through a web of conductive traces. The need to minimize space consumption coupled with the increasing functionality of each chip give rise to difficult design problems.

The design of circuit layouts in printed circuit board and multi-chip module technology is an immensely complex problem due to the numerous physical, electrical, and thermal design factors. The designer's task is to place thousands of components having varying sizes and connection configurations within a minimal space while optimizing connectivity among components. To complicate this task, placement of components based on electrical constraints conflicts with placement based on thermal constraints. The designer must place components as close together as possible to minimize electrical signal delays. However, to minimize thermal interaction among components, for example, the designer must space the components sufficiently apart or provide various cooling techniques such as introducing convection cooling, heat sinks, or thermal vias to remove heat. If the designer introduces a cooling technique to the circuit layout, the designer must account for the impact of these cooling techniques on routing, the interconnection of the components.

In addition to thermal phenomena or characteristics such as thermal stress and thermal mass effects, other phenomena of an electrical component such as mechanical stress and electromagnetic effects are also critical to component placement because of the interaction among components due to such phenomena. To help account for these important design issues, designers have enlisted the aid of computers because of the complex mathematics involved. However, existing computer programs do not adequately address the impact of component behavior on component placement.

While computers can be used to optimize the design of circuit layouts, creating a program that accounts for thermal constraints as well as physical and electrical constraints poses a problem for computer programmers. The massive amount of data that must be processed to provide a detailed analysis of a component's behavior cannot be incorporated into existing placement routines. For example, existing placement programs do not adequately address the problem of thermal interaction among components. Existing placement techniques that do provide for thermal placement either over-simplify the thermal analysis by examining only the thermal parameter or fail to provide for the placement of components based on such essential design considerations such as component connectivity or component size and shape. It is needed, therefore, to provide a placement system that incorporates a detailed analysis of a component's behavior into the placement of the components in a circuit layout.

Circuit designers use placement programs to optimize placement of components on a circuit layout. Such programs employ placement algorithms that seek to provide the best placement for a given number of circuit components. Placement algorithms can be grouped in two classes: heuristic, and analytical methods. Under the heuristic method, the algorithm typically begins from a random placement of components, and then compares successive placements in a step by step process. Algorithms using this approach may produce a result that is highly dependent on the sequence of placements. Under the analytical method, the algorithm defines a function as the figure of merit for placement, then minimizes the function to obtain a placement. Both of these methods are described in more detail in L. Sha and R. Dutton, *An Analytical Algorithm For Placement of Arbitrarily Sized Rectangular Blocks*, 22nd Design Automation Conference, IEEE 1985. In this article, Sha and Dutton disclose a placement algorithm that uses an analytical algorithm to place components in a circuit layout. This particular technique, while incorporating the size and shape of the components, as well as connectivity among all components, fails to provide any thermal analysis.

One method for incorporating thermal analysis into the placement of components is to estimate thermal interaction by using a single thermal characteristic in the placement of the components. This approach provides for thermal placement by using a single thermal characteristic of each component, the power consumption, in the placement of the component. This approach fails to provide a detailed thermal analysis because power consumption is only one among many variables affecting thermal interaction among components.

Other placement techniques provide only thermal placement without incorporating other important electrical or physical design considerations. Such techniques may employ a heuristic algorithm including repeated steps of placing components then performing thermal analysis on each placement. In such approaches, a computer program performs a thermal analysis for a test layout by, for example, determining the maximum temperature of a layout as a whole or minimizing the temperature of each component in the layout. Then the program swaps a component and repeats the thermal analysis. With each new configuration, the program compares the thermal characteristic of a layout and substitutes a the new configuration if it provides a lower maximum temperature. This technique yields a placement that may be very dependent on the sequence of placements generated by the algorithm, and thus, must perform additional comparison to provide a better placement.

The main drawback to this type of an approach is that it requires repeated placement and checking. Such thermal analysis amounts to mere verification of the thermal characteristics of a placement rather than providing placement that integrates both thermal analysis and placement.

To provide a more optimized placement, a program should not sacrifice a thorough thermal analysis. Sophisticated thermal analysis programs exist, such as AutoTherm commercially available from Mentor Graphics, Corp., that provide a very accurate thermal picture of a PCB or MCM design layout. As in sophisticated thermal analysis products like AutoTherm, a detailed thermal analysis should take into account several thermal characteristics such as heat transfer to a substrate in MCM technology, heat transfer through a molding compound, and heat transfer through a bond to name a few. It is desired, therefore, to provide a method and system for integrating a detailed thermal analysis with a placement system. With such a method and system, placement systems could simultaneously provide circuit layouts that minimize thermal interaction among components and address electrical and physical design considerations as well.

SUMMARY OF THE INVENTION

It is therefore an object of the invention to provide a method and system for integrating component analysis into placement systems that overcomes the drawbacks of the prior art approaches.

Another object of the invention is to provide such a method and system that includes detailed thermal, electromagnetic, or mechanical analyses based on a wide range of component characteristics.

Another object of the invention is to provide such a method and system that can be adapted for use in placement systems that place components automatically or enable a designer to interactively place components.

To achieve these objects, the invention provides a method and system for designing the layout of electrical components. The method includes acquiring characteristics of components of the layout, and then deriving a placement parameter from the characteristics of the components. The method also includes providing for the placement of the components to minimize interaction among components.

The method may include modeling the thermal characteristic of each component on a mounting structure. From this modeling, the method may include deriving a thermal placement length to be used in the placement of components.

The invention also includes a system for designing the layout of circuit components on a mounting structure. This system includes means for acquiring characteristic data of circuit components, means for deriving a placement parameter for the component from the characteristic data, and means for placing a component in a design layout based on the placement parameter.

In particular, the invention may be implemented in a programmed computer, including a display unit and input device. A circuit designer may enter thermal characteristic data regarding components and mounting structure to the computer via the input device. The computer may be programmed to then model the thermal characteristics of each component on the mounting structure. From this model, the computer may derive a thermal placement length. The thermal placement length, representing a detailed thermal analysis of each component, can then be used in the placement of a layout of the components.

The invention has the advantage of providing a detailed component analysis, and then integrating this analysis into the placement of the components based on any number of other design considerations such as connectivity of components, routing of conductive traces among components, minimizing signal delay and crosstalk.

DETAILED DESCRIPTION OF A PREFERRED EMBODIMENT

The present invention includes both a system and method for designing the layout of components. One particular implementation of the invention is a placement system that integrates a detailed thermal analysis with component placement based on electrical and physical design constraints. This placement system may provide for automatic and interactive placement of components. Automatic placement simply means that the system performs placement based on data acquired from a circuit designer or stored in system memory. Interactive placement means that the circuit designer may manually place and move components with the aid of thermal placement criteria such as a thermal placement parameter derived from a detailed thermal analysis of each component. This system is capable of dynamically altering placement during the design when a designer, for example, changes thermal characteristics of components or changes the location of a particular component.

It should be understood that while the following description of a preferred embodiment pertains to including thermal characteristics with component placement, the invention is not limited to thermal analysis for placement. The invention may also be used to include, for example, the electromagnetic behavior or mechanical stress of a component with the placement of multiple components in a circuit layout.

This particular system embodiment incorporates a method for placing components using thermal characteristics according to the invention. The system employs the method of the invention to derive a thermal placement criteria for each component from a detailed thermal analysis of each component on a mounting structure. The system then places the component, using this thermal placement criteria.

The placement design system and associated method introduced above may be implemented in a computer program. To run the program, one preferably uses a computer workstation commonly used in computer aided design such as an Apollo Workstation from Hewlett Packard, Corp. of Palo Alto, Calif. or a Sun Workstation from Sun Microsystems, Inc. of Mountain View, Calif. Such work stations are preferable because they have sufficient memory and contain processors that run at high speeds to accommodate computer aided design software. The workstation includes a display unit suitable for displaying the detailed layout of electrical components. The workstation also includes an input device such as a keyboard for entering data regarding components to be placed in a layout. Operating the software on such a workstation, a circuit designer may use a system incorporating the principles of the invention to design the layout of electrical components. It is possible, of course, to adapt the computer program implementing the invention to run on personal computers and other types of computers as well.

Figure 1:
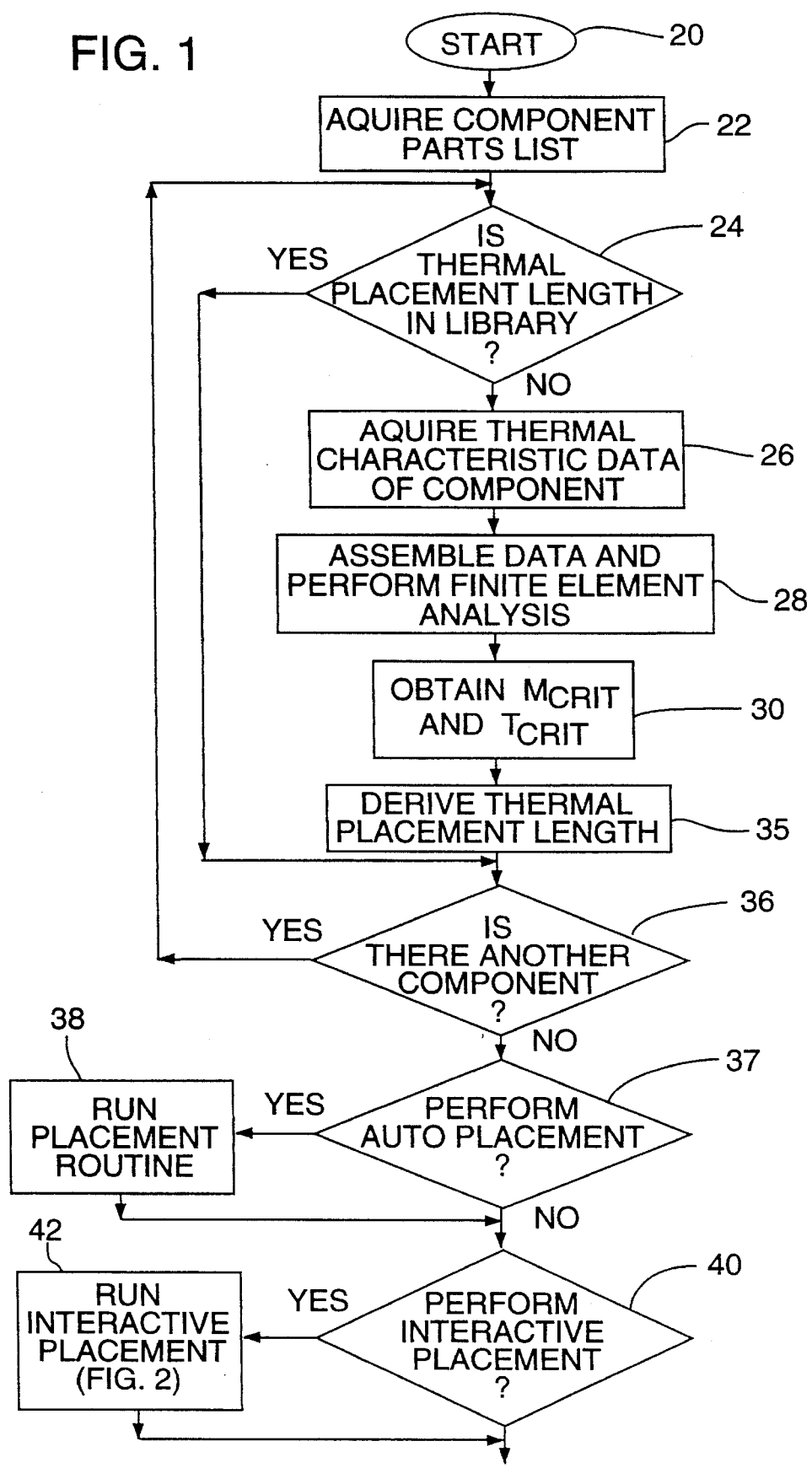
FIG. 1 is a flow chart illustrating the operation of a component placement system according to the invention.
Figure 2:
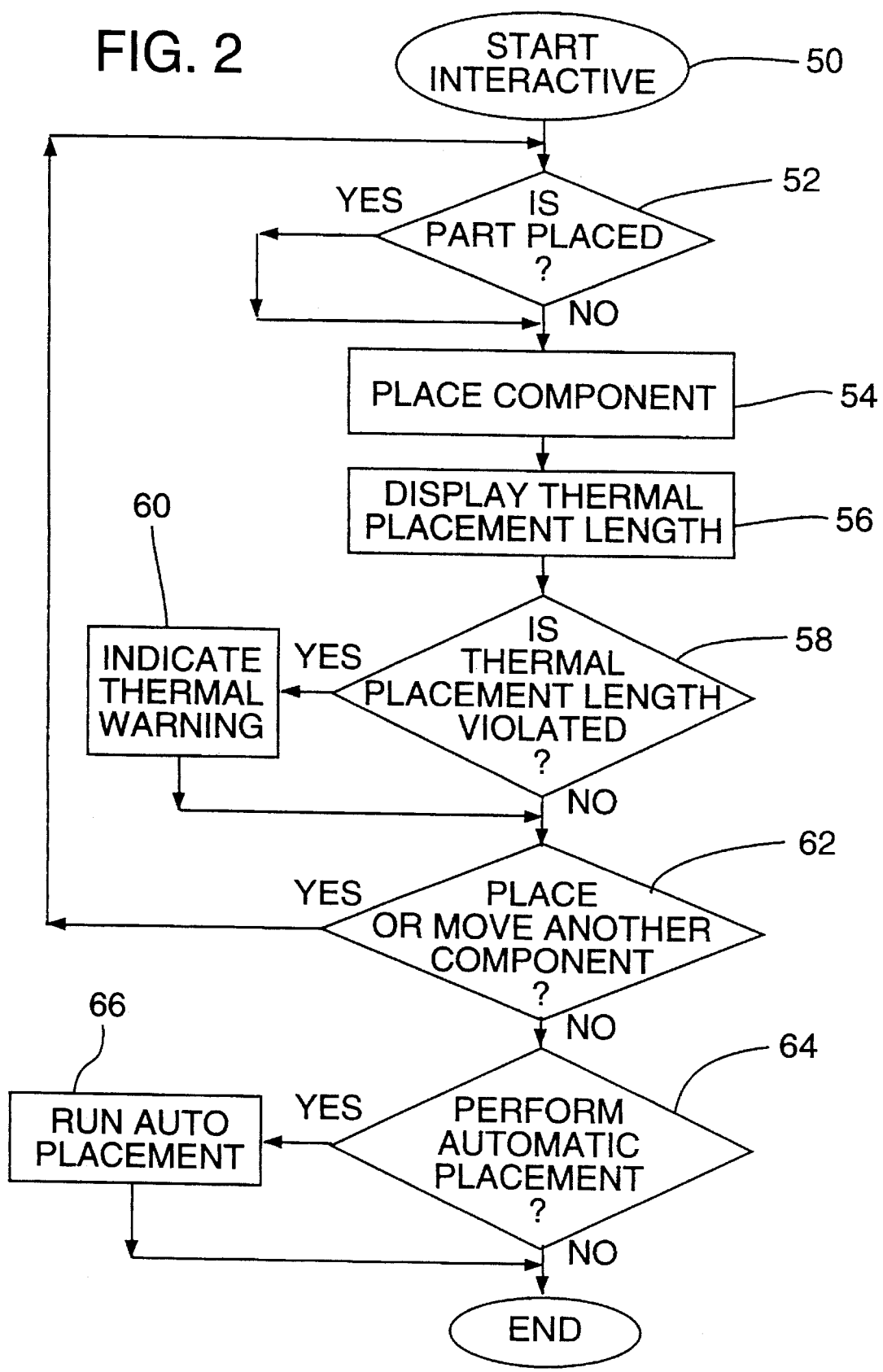
FIG. 2 is a flow chart illustrating the operation of an interactive placement system according to the invention.

The details of an embodiment of the invention are best described with reference to the accompanying drawings. FIG. 1 is a flow chart illustrating the operation of a component placement system according to the invention. FIG. 2 is a flow chart illustrating the operation of an interactive placement system according to the invention. Both FIGS. 1 and 2 illustrate the steps, numbered therein, executed by a programmed data processor in carrying out the invention.

Referring now to FIG. 1, the circuit designer begins by running the computer program embodying the invention (20). Once the designer has initiated the program by entering the appropriate commands at an input device such as a keyboard, the system begins by acquiring a list of components to be placed, such as by prompting the user for a component list (22). The designer inputs the list of components using the keyboard. The system then determines whether a file in memory, called a library, contains the thermal placement length for each component (24). The thermal placement length, derived from the thermal analysis to be described, is a minimum spacing around the component to minimize thermal interaction among surrounding components. If the thermal placement length for a particular component is stored in the library, the system does not need to proceed with a detailed thermal analysis of the component.

However, if a thermal placement length is not stored in the library, the system must perform the detailed thermal analysis. To do so, the system first acquires thermal characteristic data for each component from the user or a computer file (26). This data includes, but is not limited to, device geometry, device power, and thermal characteristics of component packaging. The data also includes thermal characteristics of the substrate to which the component will be mounted and thermal characteristics of the bonds used in the components. Finally, the data may include convection and radiation information as well as information regarding specific cooling techniques such as thermal vias or heat sinks. After acquiring this data, the system assembles the data in preparation for a mathematical analysis, such as a three dimensional finite element analysis (28).

If the system is to integrate other device characteristics with component placement such as electromagnetic effects or mechanical stress, then the system must acquire these characteristics of a component to perform the appropriate analysis. For example, to analyze a component's electromagnetic behavior, the system may require electromagnetic characteristics regarding component geometry, material type, dielectric constants, and signal characteristics, etc. Similarly, to analyze mechanical stress, the system may require mechanical stress characteristics such as yield stress, material type, thermal coefficient of expansion, thermal conductivity, etc. The specific data required depends on the particular analysis to be performed and on the numerical methods used to carry out those methods. The following description of a thermal analysis is an example of employing numerical techniques such as finite element analysis to determine component behavior for use in placement.

Thermal analysis involves modeling each component's thermal characteristics on the mounting structure to be used in the circuit layout. This system preferably employs a three dimensional finite element analysis for each component on a given substrate, although other suitable types of mathematical analyses may be used (28). Finite element analysis is known in the art and could be readily applied to this type of data to provide a temperature distribution. While this three dimensional finite element analysis is preferred, other thermal analysis techniques may also be used to derive a thermal placement length. This particular technique is used because it provides an accurate temperature distribution based on several thermal design parameters. From this temperature distribution, the system can derive a thermal placement length.

The finite element analysis produces a three dimensional temperature distribution for each component to be placed in a layout. The thermal distribution graphically includes a plot of temperature versus radial distance from the center of a component. The radial distance is represented in polar coordinates with the origin located at the center of the component. The temperature of the component typically cools with increasing distance from the origin. As such, the temperature distribution is highest at the center of the component, and then decreases with distance from the origin.

The temperature distribution provides information from which a single thermal placement parameter, the thermal placement length, may be derived. Looking at a temperature distribution of a component, a designer can determine a distance from the center component at which thermal interaction with another component would be minimized. This point can be represented by the slope of the distribution, a particular temperature value on the distribution, or both.

Figure 3:
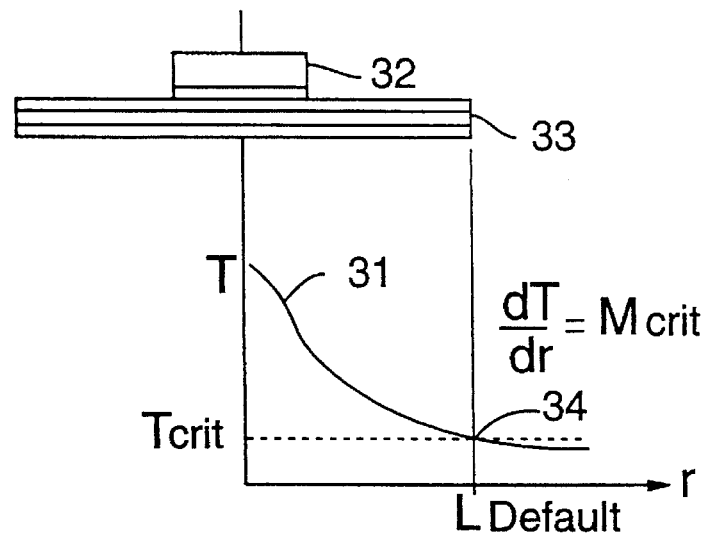
FIG. 3 is a plot of the temperature distribution of an electrical component to derive a thermal placement length for placement of the component in a circuit layout.

In this embodiment, the system derives a thermal placement length from a critical slope, Mcrit, a critical temperature, Tcrit, or both (30). FIG. 3 illustrates graphically the derivation of the thermal placement length from the temperature distribution curve 31 of a component 32 on a mounting structure such as a substrate 33. The temperature distribution, in this example, is temperature, T, as a function of radial distance, r. Though shown only in two dimensions, it should be understood that the temperature distribution may be three dimensional. One may define a thermal placement length by specifying a temperature on the temperature distribution curve or by specifying a slope of the curve. In this example, FIG. 3 illustrates a default thermal placement length, $L_{Default}$, determined from a critical slope Mcrit, at a point 34 on the temperature distribution curve where the slope equals Mcrit. In FIG. 3, this point 34 is at temperature Tcrit, but Tcrit need not be equal with the temperature on the curve at Mcrit. It should be understood that a thermal placement length may be derived from either a slope or a temperature point and each may be preprogrammed into the system or specified by a user. With Mcrit or Tcrit, the system may derive the thermal placement length for each component, modeled separately using the above described thermal analysis (35).

After performing thermal analysis for each component (36), the system can then provide either automatic or interactive placement of the components. If the designer selects automatic placement (37), the system executes a placement algorithm to place the component (38). Such placement algorithms are known in the art. A skilled programmer could create a placement algorithm that would place components using the thermal placement length as a limitation on placement. It should be understood that the thermal placement length may effectively extend the dimensions of a component with respect to the placement algorithm. Using well known placement algorithms, the system may place components to avoid overlap of the effective dimensions of a component.

The placement algorithm in the present embodiment performs in the following manner. The placement algorithm requests and receives data regarding the components from the data previously acquired for thermal analysis. The placement algorithm then determines high level groupings of parts based on connectivity, signal integrity, and delay rules. The placement algorithm then provides a preliminary placement, allowing for overlaps. Finally, the placement algorithm addresses the thermal placement length and overlaps of the components using a heuristic approach.

The placement algorithm places the components using the thermal placement length as a placement parameter just as a placement algorithm might use the size and shape of a component to avoid overlap of components. From a two dimensional perspective, one can graphically envision the thermal placement length as the radius of a circle drawn around the center of the component. The placement system uses a placement algorithm to place components such that these circles do not intersect with other circles representing placement lengths of other components.

The system also provides for interactive placement of components using the thermal placement length (40). FIG. 2 illustrates the operation of the system during interactive placement (42). During interactive placement, the designer uses an input device, such as keyboard or a mouse, to place each component individually. The designer is aided by graphic representation of the components on the display unit of the workstation. To avoid thermal interaction among components, the system displays each component with a circle representing the thermal placement length of the component. It should be understood that thermal placement length need not be graphically represented on a display. It is sufficient that the system indicates when a component has been placed too closely. Graphical representation is preferred because it eliminates trial and error in the placement process.

The interactive placement begins with the placement of each component (50), (52). A designer may place a component by using an input control device such as a mouse to position a component within a layout displayed on a display unit (54).

At any point during placement, a designer may change the thermal characteristics of the circuit components, the substrate, or the environmental conditions by inputting data and commands through an input device. In response, the system may change the thermal placement length according to the new data. The system then may display on the display unit a revised thermal placement length to aid the designer in placing a component.

Figure 4:
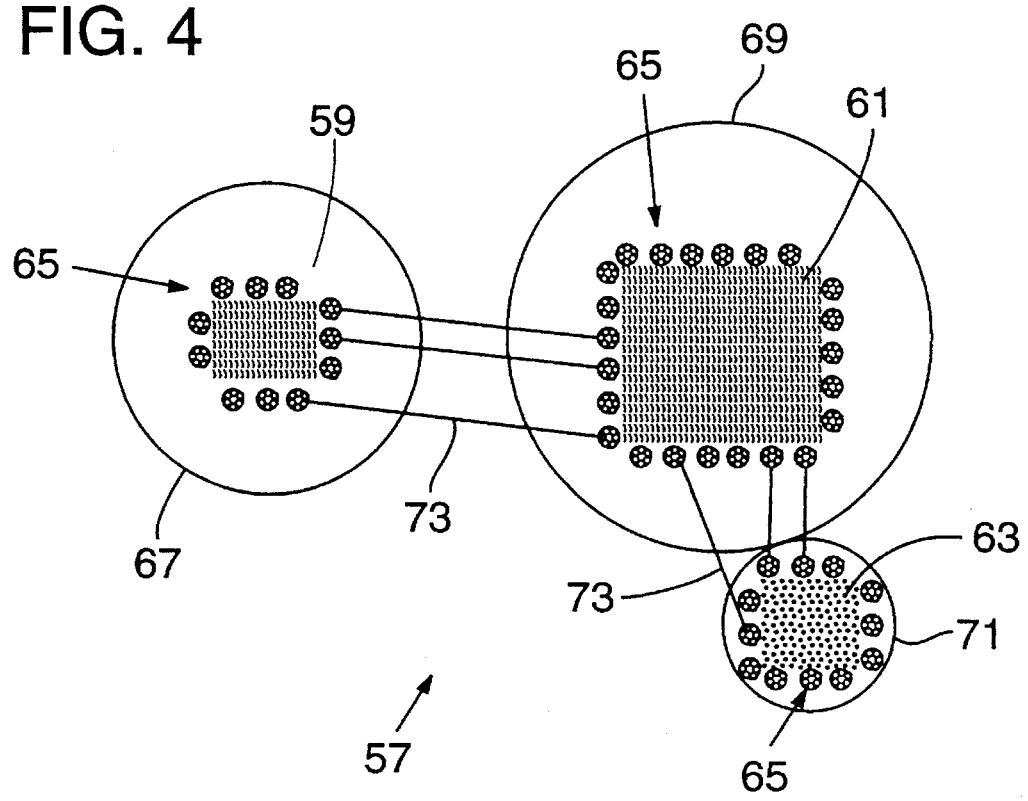
FIG. 4 illustrates an example of a display generated by the system for placing three electrical components using thermal placement lengths.

Once the designer has selected the position for a component, the system displays on a display unit the component and the circle representing thermal placement length (56). FIG. 4 illustrates an example of a display 57 generated by the system for placing three electrical components. In the illustrated example, each component, shown as a first, second, and third rectangular block 59, 61, 63, is surrounded by a series of dots 65 representing pin connections, and by a circle 67, 69, 71 representing the thermal placement length of each component. The pins may be connected with traces 73 to illustrate possible electrical connections between components. With this information displayed, a designer may move, for example, the second and third blocks 61, 63 such that the circles 69, 71 representing the thermal placement length of the component make contact without intersecting.

The system determines whether the thermal placement length is violated by determining whether the circles of adjacent components overlap or intersect (58). If the thermal placement lengths intersect, the system displays on the display unit a warning that undesired thermal interaction will occur between components (60). The designer may disregard the warning and proceed with placement.

The system continues in interactive mode until the designer has finished placing and moving components on the display unit. As the designer places components in a design layout, the designer may also move components already displayed on the display unit (62). In such cases, the system performs the same sequence of steps to determine if the thermal placement length is violated.

At any point during the interactive placement, the designer may select automatic placement of components (64), (66). The flow diagram of FIG. 2 shows automatic placement as an alternative after components have been placed or moved. If the designer wishes to complete placement automatically, or place all of the components in automatic mode, the designer may input the appropriate command to select automatic placement. The sequence of the steps between automatic or interactive placement are not critical to the operation of the invention.

In general, the steps shown in FIGS. 1 and 2 can be altered without substantively changing the operation of the embodiment. FIGS. 1 and 2 only illustrate the operation of an embodiment, and it should be understood that certain steps could be changed or eliminated without departing from the scope of the invention. For example, placement system or method need not provide both interactive and automatic placement. It is sufficient that the placement system or method provide for placement using the thermal placement criteria derived from the thermal analysis of each of the components. It is also not critical that the detailed thermal analysis consist of a three dimensional finite element analysis. A thermal placement length may be derived using various numerical methods such as finite difference, finite volume, etc.

To integrate other device behavior such as electromagnetic effects, mechanical stress, or thermal stress with the placement of components in a layout, one may use the system and method described herein. For example, the system may perform an electromagnetic analysis by using a three dimension finite element analysis to determine, for example, the electromagnetic field generated by a component. While the general numerical method of the finite element analysis would remain the same, equations pertaining to electromagnetic behavior are used in the analysis in place of the equations pertaining to thermal analysis. From the curve generated by the finite element analysis, the system may derive an electromagnetic placement parameter. In a similar manner, the system may also perform mechanical or thermal stress analyses to derive a mechanical or thermal stress placement parameter. The system is not limited in the number of phenomena that may be incorporated into component placement algorithm.

Having illustrated and described the principles of the invention in a preferred embodiment, it should be apparent to those skilled in the art that the invention can be modified in arrangement and detail without departing from such principles. I claim all modifications and equivalents coming within the spirit and scope of the following claims.

I claim:

1. In a programmed computer system including a display unit and an input device, a computer assisted method for designing a layout of components comprising:

storing characteristic data for the components in memory;

reading one of the following types of characteristic data of the components from memory: electromagnetic, thermal, or thermal stress;

separately and individually performing an electromagnetic, thermal, or mechanical stress analysis on the components corresponding to the type of characteristic data read from the memory to produce separate distribution data for the components;

deriving placement lengths for the components from the distribution data;

executing a placement program to automatically place the components in alternative layouts until a final layout is generated without performing further analysis of the components, wherein executing the placement program includes automatically checking the alternative layouts generated by the placement program to determine whether the placement length of at least a first component in each of the alternative layouts is violated, wherein a placement length of the first component is violated when the distance between the first component and another one of the components is less than the placement length for the first component.

2. The method of claim 1 wherein the reading of thermal characteristic data includes:

reading thermal characteristic data-of at least one of the components from memory;

reading thermal characteristic data of a mounting structure from memory; and reading thermal characteristic data of environmental conditions surrounding the at least one component and mounting structure from memory.

3. The method of claim 1 wherein the executing step includes:

displaying placement of the components on a mounting structure with the display unit in response to commands from the input device;

displaying at least one component on the mounting structure and associated thermal placement length in response to a command from the input device; and displaying a warning indicator if the at least one component is placed on the mounting structure displayed on the display within the thermal placement length relative to other components.

4. The method of claim 1 further including:

displaying on the display unit the placement of the components on the mounting structure in response to commands from the input device; and displaying a warning indicator if the first component is placed in the representation of the circuit layout within the thermal placement length relative to other components.

5. In a computer system having a display unit and an input device, a method for designing a layout of electrical components to minimize thermal interaction among components comprising:

reading thermal characteristics of components to be placed in the layout from memory in response to commands from the input device;

separately performing a thermal analysis of the thermal characteristics of each component to determine a thermal distribution of each component;

deriving a thermal placement length for each component from the thermal distribution of each component;

executing a placement program to place the components in alternative layouts until a final layout is generated based on the thermal placement length and physical dimensions of each component, wherein the layout is generated without performing a thermal analysis on the components after the separately performing step;

during the executing step, automatically checking the alternative layouts generated by the placement program to determine whether the thermal placement length of at least a first component in each or the alternative layouts is violated when the distance between the first component and another one of the components is less than the placement length of the first component; and displaying on the display unit layout of the components.

6. The method of claim 5 wherein reading thermal characteristics for components of a layout includes:

reading the identity of a circuit component in the layout;

determining whether the thermal characteristics of the circuit component are stored in a database of the programmed computer system;

reading the thermal characteristics for a circuit component from the database;

reading substrate thermal characteristic data from the database; and reading thermal environment data from the database.

7. The method of claim 5 wherein the executing step includes automatically placing circuit components in the layout in memory such that one or more components are not located closer than their respective thermal placement lengths relative to one or more other components.

8. The method of claim 5 wherein the executing step includes:

displaying components on a mounting structure on the display unit in response to commands from the input device; and indicating on the display unit whether the placing of components violates thermal placement rules based on the thermal placement length of the components.

9. The method of claim 8 wherein further including:

changing the thermal characteristics of circuit components, a substrate, or environmental conditions in response to commands from the input device; and in response to the change in thermal characteristics, changing the thermal placement length of the circuit components.

10. The method of claim 5 wherein the displaying step includes displaying the layout of component in three dimensions.

11. The method of claim 5 wherein the performing a thermal analysis step includes:

performing a finite element analysis of the thermal characteristics of a circuit component on a given substrate to provide a thermal model of the circuit component on the given substrate; and generating temperature distribution data representing the temperature of the thermal model as a function of location on the given substrate;

and the deriving step includes:

reading temperature distribution criteria from memory; and based on the temperature distribution criteria and the temperature distribution data, determining a thermal placement length for a circuit component.

12. The method of claim 11 wherein the reading temperature distribution criteria includes reading a critical slope from memory; and the determining step includes finding the thermal placement length by calculating a slope from the temperature distribution data and finding a data coordinate where the slope is equal to or less than the critical slope.

13. The method of claim 11 wherein the finite element analysis is a three dimensional finite element analysis.

14. The method of claim 11 wherein reading temperature distribution criteria includes reading a critical temperature from memory; and the determining step includes finding the thermal placement length by finding a data coordinate from the temperature distribution data where a temperature value at that data coordinate is equal to or less than the critical temperature.

* * * * *